May 3, 1960     A. E. CHESTER ET AL     2,935,422
CORROSION PREVENTING COATINGS AND COATING COMPOSITIONS
Filed Oct. 28, 1955
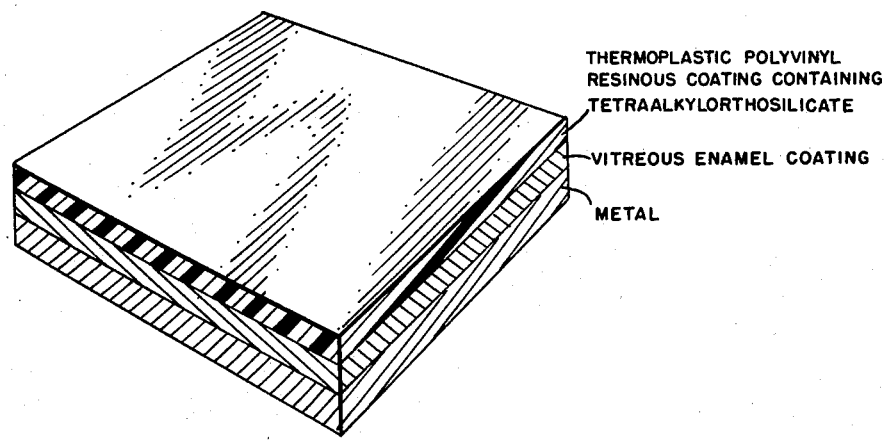
THERMOPLASTIC POLYVINYL RESINOUS COATING CONTAINING TETRAALKYLORTHOSILICATE
VITREOUS ENAMEL COATING
METAL
*INVENTORS:*
ALLAN E. CHESTER
JOSEPH P. STELLA
BY *Marshall, Johnston, Cook & Root*
ATT'YS United States Patent Office 2,935,422
Patented May 3, 1960

2,935,422
CORROSION PREVENTING COATINGS AND COATING COMPOSITIONS

Allan E. Chester, Highland Park, and Joseph P. Stella, Lake Forest, Ill., assignors to Poor & Company, Chicago, Ill., a corporation of Delaware Application October 28, 1955, Serial No. 543,585

11 Claims. (Cl. 117—70)

This invention relates to corrosion preventing coatings and coating compositions and is especially concerned with the protection of metals against corrosive attack.

It is well known that vitreous enamels have been applied to metals, especially ferrous metals, and are useful in preventing corrosion. Such protective materials, however, are essentially glasses and therefore subject to the disadvantages inherent in glasses, such as brittleness. Moreover, when a crack occurs in the vitreous enamel the underlying metal is no longer protected against corrosion.

One of the objects of the present invention is to provide coatings utilizing coating compositions which are vitreous or glass-like in nature.

Another object of the invention is to provide a new and improved method of protecting metals against corrosion by applying thereto a plurality of layers of coating compositions which adhere to each other and afford a combined enhanced corrosion protection.

Still a further object of the invention is to provide a method of protecting metals against corrosion which is relatively inexpensive.

An additional object of the invention is to provide new and useful coating compositions.

Another object of the invention is to provide new and improved protectively coated articles made from materials that are normally susceptible to corrosion. Other objects will appear hereinafter.

In accordance with the invention it has been found that new and improved results in protecting articles which are normally susceptible to corrosion can be obtained by surface coating such articles with a combination of layers or coatings of protective materials wherein the coating adjacent the article itself is a vitreous coating and over the vitreous coating there is applied a resinous coating containing a colloidal silica or colloidal silicate. This second coating is referred to herein as a sealer coating because it serves to seal any pinholes or fine cracks which may be present or may develop in the vitreous coating. Additionally, it acts as a shock absorber for the vitreous coating.

The accompanying drawing illustrates an article provided in accordance with the invention.

In the practice of the invention it is preferable that the sealer coating be acidic and that the silica therein be incorporated as an organic silicate, preferably tetraethylorthosilicate. In some unexplained manner the silica provides intimate wetting between the sealer coating and the glass coating and thereby increases the adherence between these coatings. Where an acidic component is present in the sealer coating, the intimate wetting action also assists in neutralizing the alkali normally present in most vitreous compositions.

In addition to the sealer coating it is often desirable in the practice of the invention, especially where different colors are desired, to provide a pigmented cover coating which also preferably contains a resin and is compatible with the sealer coating.

The best mode contemplated for the practice of the invention is illustrated by the following example in which the quantities are stated in parts by weight unless otherwise indicated.

*Example*

A glass frit is prepared by smelting together the following ingredients:

| Ingredients: | Parts by weight |
|---|---|
| 140 mesh Keweenaw felsitic conglomerate | 10.8 |
| Barium carbonate | 34.5 |
| Sodium silicofluoride | 22.8 |
| Boric acid | 21 |
| Zinc oxide | 10.6 |

This frit is ground in a ball mill with suitable mill additions of clay with or without the addition of suitable coloring oxides, and milled in from 40 to 50 parts of water per 100 parts of frit until a 50 ml. sample gives no residue on a 325 mesh screen. The whole mass is then passed through a 200 mesh screen to produce a composition hereinafter referred to as Composition A, and sprayed on to a ferrous metal article, e.g., cold rolled SAE 1010 steel. The water is dried out and the vitreous enamel coating is fused by firing at a temperature above the melting point of the vitreous enamel. This forms the vitreous coating on the article.

A composition B is prepared from the following ingredients:

Composition B:

| Ingredients— | Parts by weight |
|---|---|
| (1) Polyvinylbutyral resin (XYHL) | 10.95 |
| (2) Ethyl alcohol (denatured) | 62.20 |
| (3) Chromic acid ($CrO_3$) | .465 |
| (4) Water | .930 |
| (5) 85% phosphoric acid ($H_3PO_4$) | 1.095 |
| (6) Acetone | 9.860 |
| (7) n-Butyl alcohol | 14.5 |

In preparing this composition, ingredients 3 and 4 are mixed together and ingredients 5 and 6 are mixed together. The two mixtures are then added to each other. Ingredients 1 and 2 are mixed together and the mixture obtained by mixing ingredients 3, 4, 5 and 6 is added to the mixture obtained by mixing ingredients 1 and 2. This procedure is used because the direct addition of acids to the polyvinylbutyral resin might otherwise tend to destroy the resin.

To 99 volumes of the above mixture is added one volume of tetraethylorthosilicate, thereby completing the preparation of Composition B.

Composition B is applied as a coating B over the coating A previously described.

At this stage, the steel is provided with excellent protection against corrosion. However, it is sometimes desirable to apply a pigmented cover coat hereinafter referred to as coating C.

The pigmented cover coating C is preferably prepared from the following Composition C:

Composition C:

| Ingredients— | Parts by weight |
|---|---|
| Partially hydrolyzed copolymer of vinyl chloride and vinyl acetate with a vinyl chloride content of approximately 91% and which is thermoplastic, neutral and non-oxidizing (e.g., VAGH) | 15 |
| Di-2-ethylhexylphthalate | 1.5 |
| 1,2-propylene oxide | 0.2 |
| Equal volume mixture of methyl isobutyl ketone and toluene | 70.3 |
| Tetraethylorthosilicate | 1.0 |
| Pigment (e.g., titanium dioxide, antimony trioxide, strontium oxide, chromium trioxide, basic zinc chromate, phthalocyanine blue and phthalocyanine green) | 12 |

In Composition C the di-2-ethylhexylphthalate is a plasticizer; the propylene oxide is a stabilizer to prevent formation of HCl due to the hydrolysis of the copolymer; the methyl isobutyl ketone and toluene are organic solvents and the tetraethylorthosilicate functions to increase the adherence to coating B by wetting the surface of the coating.

The tetraethylorthosilicate not only provides increased adherence between the coatings B and A and C and B, respectively, but also improves the corrosion resistance of the resultant coated article.

In this example, the XYHL resin is a white powder having an intrinsic viscosity of 0.81, a specific gravity of 1.12 and is composed of 80.7% by weight of polyvinylbutyral; 19% by weight polyvinyl alcohol and 0.3% by weight polyvinyl acetate.

In Composition A the Keweenaw conglomerate is a felsitic conglomerate having the following constituents:

| | Percent |
|---|---|
| Ignition loss | 2.56 |
| $SiO_2$ | 63.86 |
| $Al_2O_3$ | 12.73 |
| $Fe_2O_3$ | 7.39 |
| $TiO_2$ | .96 |
| CaO | 3.44 |
| MgO | 1.02 |
| CuO | .20 |
| $Na_2O$, $K_2O$ | 7.84 |

The Composition A of the foregoing example produces a vitreous coating which can be described as a soft glaze and very good results have been obtained with this coating. It has also been found, however, that other types of vitreous enamels can be substituted for Composition A and the protective coatings B and/or C can be applied to any such vitreous base coatings. As an illustration of another type of enamel coating suitable for coating A the vitreous enamel coatings disclosed in U.S. Patents 2,301,741, 2,321,656, 2,321,657 and 2,321,658 can be used. Other examples of vitreous coatings suitable for the practice of the invention are given in Andrews, "Enamels," page 40 (1935).

In the practice of the invention it was at first thought that the vitreous coating A should be a relatively rough matte coating rather than a smooth glossy coating and the example illustrates this type of coating. This belief was based in part on the concept that the thermoplastic resinous coating B would adhere better to a relatively rough coating. Subsequently, however, it has been found that satisfactory adherence and excellent corrosion protection are provided by coatings A and B where coating A is a glossy type, relatively smooth vitreous enamel coating.

It is preferred in the practice of the invention where the complete three-coat system is employed as described in the previous example to provide a coating of 1.5 to 2 mils thickness for coating A, approximately 0.5 mil thickness for coating B and approximately 1 mil thickness for coating C.

The proportion of the organic silicate used in the preparation of Compositions B and C may be varied by substituting ¼ to 10 volumes of the organic silicate for the 1 volume in Composition B, and by substituting ¼ to 10% of the organic silicate for the 1% in Composition C, the latter substitution being made with a corresponding reduction in the organic solvent.

Composition C preferably has a viscosity at 68° F. on a No. 4 Ford cup within the range of 53 to 56 seconds. Coating B is preferably heated to about 135° F. after it is applied. The coating C can be air dried or baked at temperatures as high as 350° F. The firing temperatures of the vitreous enamels will normally vary within the range of 800° F. to 1600° F. Hence, the subsequent baking of coatings B and C over the vitreous enamel coating have no effect on the latter.

While the optimum results in providing corrosion protection are obtained by a multiple coat system in which one of the coats is a vitreous enamel coating and the other is a resinous coating containing an organic silicate, results which are satisfactory for many purposes are obtained by omitting the vitreous enamel coating and by merely applying to the metal to be protected a resinous coating similar to coating B.

To illustrate the effect of the organic silicate a number of tests were made in which a 5/10 mil (.0005") coating of Composition B on sandblasted steel was subjected to a standard ASTM salt spray test and provided corrosion protection to said steel for 750 to 1000 hours. The same coating without the organic silicate failed in 4 to 6 hours. The complete multiple coating A—B—C did not fail under the same test in 2000 hours.

The invention is not limited to a particular organic silicate. Instead of tetraethylorthosilicate a high molecular weight mixture of polyethoxy siloxanes sold commercially as "Ethyl Silicate 40" can be employed. This condensed silicate contains polymers ranging from dimers and trimers to higher molecular weight fractions which are partially cyclicized. In the presence of acids or alkalis and water the organic silicates tend to hydrolyze to colloidal silica ($SiO_2$). Condensed silicic esters are normally prepared by two general routes. One involves the partial hydrolysis of an orthosilicic ester followed by heating to complete the condensation of silanol groups which are formed and then removing the remaining ortho ester by distillation. The second method involves starting with an alkoxy chlorosilane, such as $(C_4H_9O)_2SiCl_2$ and hydrolyzing the chloro groups while simultaneously bringing about the condensation without disturbing the alkoxy groups. For the purpose of the present invention the alkoxy groups are preferably lower alkoxy groups, such as methoxy, ethoxy, propoxy or butoxy. However, in general, organic silicates can be used which are capable of being hydrolyzed to colloidal silica.

The organic silicate of the type previously described can also be incorporated with the glass frit as a mill addition. This serves the purpose of increasing the silica content and the organic materials also act as reducing agents. However, in the firing of the vitreous coating the organic materials are driven off and the action here is not the same as that of the organic silicate in the subsequently applied resinous coating.

The resins employed in Compositions B and C are preferably thermoplastic polyvinyl resins, as, for example, polyvinyl chloride, polyvinylidine chloride, polyvinylbutyral, and various mixtures thereof with polyvinyl alcohol and polyvinyl acetate. Other thermoplastic resins which can be used are the methyl methacrylate polymers which can also be classified generally as polyvinyl resins. All of these resins are characterized by a linear carbon chain derived from the vinyl groups and having various side chains depending upon the initial starting material. For the purpose of the present invention it is essential that the thermoplastic resin employed also be water insoluble.

According to another aspect of the invention metals which are susceptible to corrosion, particularly ferrous metals, are coated with a combination of coatings B and C without first applying coating A. The resultant multiple coating affords substantial corrosion protection which is suitable for many purposes but less desirable from the standpoint of overall protection than the combined three-coat protection.

The invention is especially useful in providing corrosion protecting coatings for exhaust pipes, manifolds, oil tanks, oil and gas pipelines, structural steel for buildings and bridges, and other types of metal parts which are normally subject to severe corrosion conditions.

The invention is hereby claimed as follows:

1. A process of protecting a metallic article normally susceptible to corrosion which comprises applying to said article in the order named a vitreous enamel coating and a predominantly thermoplastic polyvinyl resinous coating containing a minor proportion of a tetraalkylortho silicate capable of being hydrolyzed to colloidal silica, said silicate being admixed with said resinous coating in an amount sufficient to enhance the adherence of said resinous coating to said vitreous enamel coating.

2. A process of protecting a metallic article normally susceptible to corrosion which comprises applying to said article in the order named a vitreous enamel coating and a predominantly thermoplastic polyvinyl resinous coating containing a minor proportion of a tetraalkylorthosilicate wherein said alkyl group contains from 1 to 4 carbon atoms in an amount sufficient to enhance the adherence of said resinous coating to said vitreous enamel coating.

3. A process of protecting a metallic article normally susceptible to corrosion which comprises applying to said article in the order named a vitreous enamel coating and a predominantly thermoplastic polyvinyl resinous coating containing a minor proportion of a condensed tetraalkylorthosilicate ester capable of being hydrolyzed to colloidal silica, said condensed silicic ester being admixed with said resinous coating in an amount sufficient to enhance the adherence of said resinous coating to said vitreous enamel coating.

4. A process of protecting a ferrous metal article normally susceptible to corrosion which comprises applying to said article a coating of vitreous enamel and then applying to said vitreous enamel coating an acidic coating of a film forming composition comprising a thermoplastic polyvinyl resin and an ethyl silicate, said thermoplastic polyvinyl resin being admixed with said ethyl silicate in a major proportion as compared with said ethyl silicate and the quantity of said ethyl silicate being sufficient to enhance the adherence of said restinous coating to said vitreous enamel coating.

5. A process of protecting a ferrous metal article normally susceptible to corrosion which comprises applying to said article a coating of vitreous enamel and then applying to said vitreous enamel coating a second coating composition comprising a polyvinyl resin consisting predominantly of polyvinylbutyral, a minor proportion of chromic acid, a minor proportion of phosphoric acid and a mixture of lower aliphatic alcohols admixed with a minor proportion of tetraethylorthosilicate, the quantity of said tetraethylorthosilicate being sufficient to enhance the adherence of said coating composition to said vitreous enamel coating.

6. A process as claimed in claim 5 in which a pigmented cover coat comprising a tetraethylorthosilicate and a partially hydrolyzed copolymer of vinyl chloride and vinyl acetate with a predominating vinyl chloride content is applied over said second coating, the tetraethylorthosilicate being admixed with said copolymer in a minor proportion as compared with the amount of said copolymer.

7. In a process of providing corrosion protection for a metallic article normally susceptible to corrosion, the step which comprises applying to said article a resinous coating composition containing a major proportion of a thermoplastic polyvinyl resin and a minor proportion of a tetraalkylorthosilicate wherein said alkyl group contains from 1 to 4 carbon atoms silicate capable of being hydrolyzed to colloidal silica, said silicate being admixed with said polyvinyl resin in an amount sufficient to enhance the adherence of said resinous coating composition.

8. A metallic article coated with a vitreous enamel coating over which in turn is coated a predominantly thermoplastic polyvinyl resinous coating containing a tetraalkylorthosilicate wherein said alkyl groups contain from 1 to 4 carbon atoms silicate capable of being hydrolyzed to colloidal silica, said silicate being admixed with said resinous coating in an amount sufficient to enhance the adherence of said resinous coating to said vitreous enamel coating.

9. An article as claimed in claim 8 in which the surface of said article adjacent said vitreous enamel coating is a ferrous metal.

10. A metallic article coated with a vitreous enamel coating over which in turn is coated a thin film of a water insoluble thermoplastic vinyl resin containing tetraethylorthosilicate, said silicate being admixed with said vinyl resin in an amount sufficient to enhance the adherence of said film to said vitreous enamel coating.

11. A metallic article coated with a vitreous enamel coating over which in turn is coated a thin film of a water insoluble thermoplastic vinyl resin containing a condensed tetraethylorthosilicate, said silicate being admixed with said vinyl resin in an amount sufficient to enhance the adherence of said film to said vitreous enamel coating.

References Cited in the file of this patent

UNITED STATES PATENTS

| Number | Name | Date |
|---|---|---|
| 1,930,331 | Zimmer | Oct. 10, 1933 |
| 2,090,617 | Bley | Aug. 24, 1937 |
| 2,215,048 | McGregor et al. | Sept. 17, 1940 |
| 2,385,921 | Jordon | Oct. 2, 1945 |
| 2,466,642 | Larsen | Apr. 5, 1949 |
| 2,484,242 | Nagel | Oct. 11, 1949 |
| 2,494,920 | Warrick | Jan. 17, 1950 |
| 2,562,118 | Osdal | July 24, 1951 |
| 2,562,119 | Haon | July 24, 1951 |
| 2,572,906 | Berringer | Oct. 30, 1951 |
| 2,725,310 | McBride | Nov. 29, 1955 |
| 2,744,878 | JoHannsen | May 8, 1956 |

UNITED STATES PATENT OFFICE
CERTIFICATE OF CORRECTION

Patent No. 2,935,422                      May 3, 1960

Allan E. Chester et al.

It is hereby certified that error appears in the printed specification of the above numbered patent requiring correction and that the said Letters Patent should read as corrected below.

Column 4, line 48, for "aclohol" read -- alcohol --; column 6, line 17, strike out "silicate".

Signed and sealed this 11th day of October 1960.

(SEAL)
Attest:
KARL H. AXLINE
Attesting Officer

ROBERT C. WATSON
Commissioner of Patents